United States Patent Office.

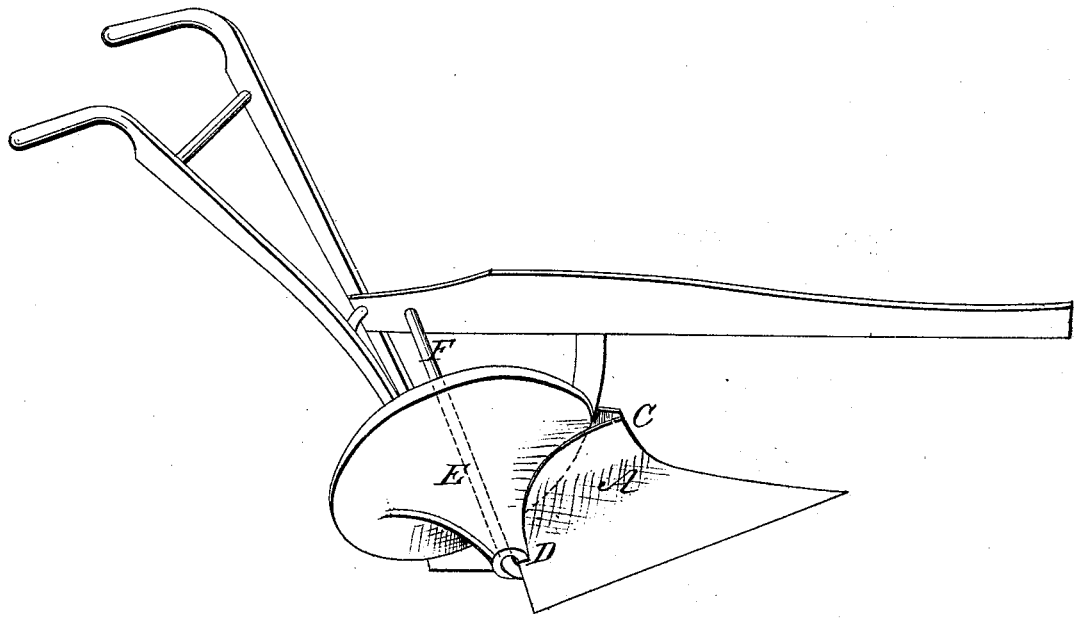

WILLIAM B. WEST, OF UTICA, WISCONSIN.

Letters Patent No. 95,960, dated October 19, 1869.

IMPROVEMENT IN PLOWS.

The Schedule referred to in these Letters Patent and making part of the same.

*To all whom it may concern:*

Be it known that I, WILLIAM B. WEST, of Utica, in the county of Dane, and State of Wisconsin, have invented a new and useful Improvement in Plows; and I do hereby declare that the following is a full, clear, and exact description thereof, which will enable others skilled in the art to make and use the same, reference being had to the accompanying drawing, forming part of this specification.

The object of this invention is to provide an improved rotary mould-board attachment for plows, as a substitute for a part of the common mould-board, whereby an anti-friction roner may be employed to receive the earth from the front part of the mould-board, and turn it over more easily, and without packing, as the plows do, as now constructed.

My invention consists in shortening the mould-board at the rear and top, and in applying, in substitution thereof, a concavo-conical anti-friction roller, so arranged that after the earth has been separated in front of the plow, and the separated part slightly elevated or turned, it will be delivered on to the said roller, which will be set into motion by the friction of the earth and the forward movement of the plow, and thereby be brought under the earth, to turn it over and discharge it in a manner to avoid the great friction consequent upon forcing the mould-boards, as at present constructed, to slide under the earth, all as hereinafter more fully specified.

The drawing represents a perspective view of my improved plow.

Similar letters of reference indicate corresponding parts.

I propose to reduce the mould-board A in the rear and upper extension, preferably shaping them upon the curved line as represented from C to D, and to interpose behind the said mould-board an anti-friction roller, E, of concavo-conical form, suited to the form of the mould-board on the said curved line C D, and adjusted on an axle, F, supported near the bottom of the mould-board at the rear, and upon the beam near the handle S at the other end.

The said axle may either be in fixed bearings, and the roller made to turn on it, or it may have journals at each end, and turn with the roller.

By this arrangement the earth to be turned over is delivered without being caused to slide over so much surface, and the friction greatly reduced thereby.

The plow also clears better, and is less liable to clog, and the furrow is turned more evenly, and not packed as hard as by the plows now in use.

I propose to apply these rollers to either right or left-turning plows, and such side-hill plows as are adjustable to either hand.

Having thus described my invention,

What I claim as new, and desire to secure by Letters Patent, is—

The combination, with a plow, of the anti-friction-rollers E, shaped and arranged substantially as specified.

WILLIAM B. WEST.

Witnesses:
THOMAS NELSON,
ADOLPH JOHNSON.